United States Patent [19]

Missout

[11] Patent Number: 4,548,567

[45] Date of Patent: Oct. 22, 1985

[54] APPARATUS FOR MANUFACTURING A GROOVED CYLINDRICAL CORE PARTICULARLY FOR OPTICAL CABLE

[75] Inventor: Bernard M. Missout, Arcueil, France

[73] Assignees: Societe Anonyme de Telecommunications; Societe Industrielle de Liaisons Electriques, both of France

[21] Appl. No.: 437,310

[22] Filed: Oct. 28, 1982

[30] Foreign Application Priority Data

Oct. 28, 1981 [FR] France .................. 81 20203

[51] Int. Cl.[4] ............................................ B29C 21/00
[52] U.S. Cl. .................................. 425/113; 264/284; 264/310; 264/312; 425/133.1; 425/326.1; 425/376 B; 425/380; 425/381; 425/382 R
[58] Field of Search ............... 425/376 B, 380, 381, 425/382 R, 326.1, 325, 113, 114, 131.1, 133.1; 264/310, 312, 284

[56] References Cited

U.S. PATENT DOCUMENTS

| | | | |
|---|---|---|---|
| 3,249,668 | 5/1966 | Scragg et al. | 425/380 |
| 3,276,075 | 10/1966 | Harwood | 425/381 |
| 3,279,501 | 10/1966 | Donald | 264/312 |
| 3,321,805 | 5/1967 | Given | 425/380 |
| 3,435,105 | 3/1969 | Ferrari | 425/326.1 |
| 3,440,686 | 4/1969 | Corbett | 425/376 B |
| 3,461,499 | 8/1969 | Nevin et al. | 425/113 |
| 3,496,605 | 2/1970 | Owaka | 264/312 |
| 3,642,396 | 2/1972 | Meneidis | 425/376 B |
| 3,666,389 | 5/1972 | Nelson | 425/381 |
| 3,969,451 | 7/1976 | Floyd et al. | 264/242 |
| 4,017,244 | 4/1977 | Vellani | 425/326.1 |
| 4,053,274 | 10/1977 | Lemelson | 425/381 |
| 4,181,486 | 1/1980 | Saito | 425/113 |
| 4,205,899 | 6/1980 | King et al. | 264/1.5 |
| 4,207,045 | 6/1980 | Rasmussen | 425/376 B |
| 4,220,628 | 10/1978 | Simos | 425/376 B |
| 4,395,210 | 7/1983 | Hama | 425/377 |

FOREIGN PATENT DOCUMENTS

| | | | |
|---|---|---|---|
| 0078213 | 5/1983 | European Pat. Off. | 425/131.1 |
| 2259689 | 2/1974 | France | 425/376 B |
| 45-28665 | 8/1971 | Japan | 425/376 B |

Primary Examiner—Jeffery Thurlow
Assistant Examiner—Patrick Dailey
Attorney, Agent, or Firm—Lowe, King, Price & Becker

[57] ABSTRACT

This invention relates to manufacturing a grooved cylindrical core by extrusion. The manufacturing device comprises a single rotating integral die that has a tapered rear portion and a grooved cylindrical front portion. The tapered portion surrounds a stationary central member and guides the material from a main extruder. The front portion has a bore including linear or helical channels. The sealing problems are obviated since the tapered portion and the grooved portion make up an integral die. This die further enables to produce a grooved core perfectly gauged. According to another aspect, the threads or stripes between core grooves are identified by means of auxiliary extruders feeding predetermined die channels with extrusion materials having different colours. This stripe identification is particularly used for a core constituting the central strand of an optical cable.

26 Claims, 5 Drawing Figures

APPARATUS FOR MANUFACTURING A GROOVED CYLINDRICAL CORE PARTICULARLY FOR OPTICAL CABLE

BACKGROUND OF THE INVENTION

1. Field of the Invention

The present invention relates to a device for extruding a grooved cylindrical core particularly used as a central cylindrical strand of an optical cable, with each groove following a helical path around the longitudinal axis of this strand and containing one optical waveguide or optical fiber.

2. Description of the Prior Art

A device for manufacturing a rubber tube having helical peripheral threads or stripes is disclosed in French Pat. No. 1,002,545 wherein a sole extruder includes an extruding screw axially centered behind a central member located in a conical bore of a stationary first die through which extrusion material is forced. A small end of this stationary die has a small cylindrical bore determining the outside diameter of the tube or core to be extruded, including the grooves. The stationary die cylindrical bore is extended axially by a short cylindrical bore of a second die that is rotatable about the central member. The rotating die cylindrical bore carries channels to form cylindrical grooves in the smooth surface of the cylindrical core discharged from the stationary die. The grooves are helically formed by rotation of the second die.

In this prior art device, the grooved core is obtained in two separate stages. The first stage consists of producing a cylindrical core with no grooves in the stationary die. The second stage consists of furrowing grooves in the still malleable material of the cylindrical core via the rotating die, causing several disadvantages. For example, core groove profile is only coarsely gauged since the rotating die acts upon partially cooled material. Also, high material pressures are exerted on the rotating die and particularly on the junction between the stationary die cylindrical bore and the rotating die channelled bore which can cause sealing problems, such as material return and leakage between the two dies. Furthermore, these imperviousness problems are augmented by the very mounting of the rotating die which is lodged in the front of the device by means of a roller bearing behind the rotating die and around a shoulder of the device framework. With time and wear, significant play can creep in between the two dies, which reduces the accuracy of the desired gauging still further.

OBJECTS OF THE INVENTION

The main object of this invention is to obviate the hereinabove drawbacks.

Another object of this invention is to produce a perfectly-gauged grooved core in a one step process which would hence resolve the sealing problems in the manufacturing device.

SUMMARY OF THE INVENTION

According to the present invention, the device for manufacturing a cylindrical core having helical peripheral grooves comprises a main extruder, a central member, means around the central member for guiding the flow of an extrusion material from the main extruder, and rotating means continuing the material flow guiding means and having a bore including channels whose cross section is equal to that of the grooved core. The material flow guiding means and the rotating means constitute a single rotating integral die.

According to another aspect, the invention enables identification of optical waveguides included in the grooves of the core. The identification is obtained by feeding predetermined channels in the rotating die with a coloured extrusion material from an auxiliary extruder or with coloured extrusion materials from several respective auxiliary extruders so as to colour one or several respective threads or stripes between core grooves.

Other features, objects and advantages of this invention will be more clearly apparent from the following more particular description of preferred exemplified embodiments as illustrated in the corresponding accompanying drawings.

BRIEF DESCRIPTION OF THE PREFERRED EMBODIMENTS

Figure 1:
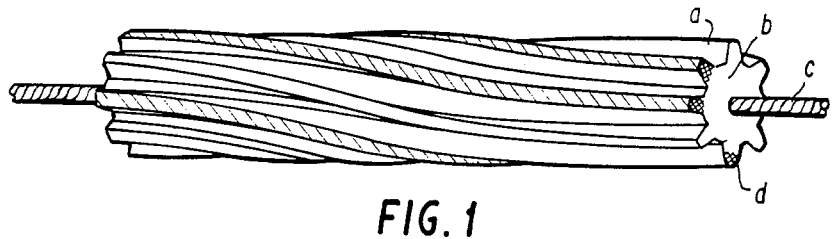
FIG. 1 is a perspective view of a helical-groove core for optical cable having three coloured threads according to the invention.

The specific embodiment of the manufacturing device described hereinafter is intended for obtaining a core having peripheral helical grooves for each receiving an optical fiber of an optical fiber cable. This cable is described in French Pat. No. 2,312,788. The core is shown in FIG. 1. It has a structure b with an overall cylindrical profile such as a sleeve or ring, that is reinforced axially by a central traction member c constituted by one metallic wire or several twisted metallic wires. Equally spaced out around the circumference of the core structure b are grooves a that have judiciously selected dimensions as described in French Pat. No. 2,312,788. Generally speaking, the cross-section of the grooves can assume a semi-circular, V, trapezoidal or square shape. The grooves follow parallel helical paths around to the axis of the cylindrical structure b such that the average tension in the optical fibers lodged in the grooves is zero as the cable assumes certain curvatures during manufacture and in particular when it is being laid.

Figure 2:
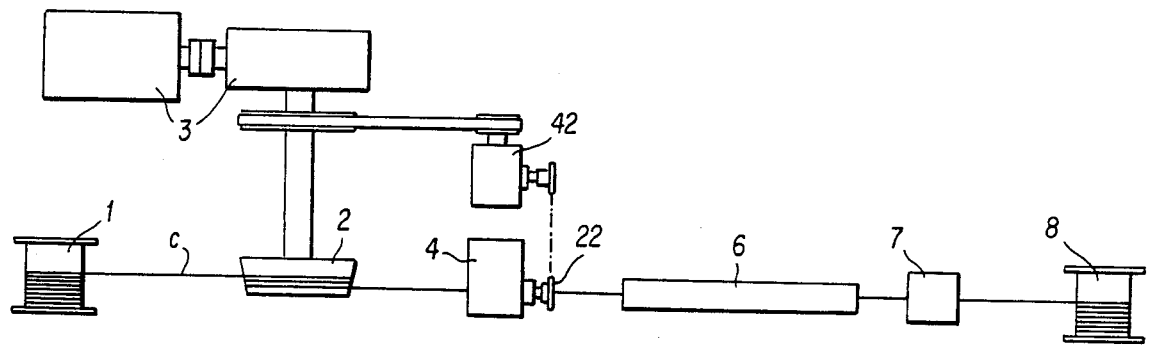
FIG. 2 is a schematic diagram of the production line for manufacturing such a core.

FIG. 2 schematizes the producing line used for the manufacture of the core described. The production line includes a reel 1 that pays out the strength member c which is then wrapped around a capstan 2. The capstan 2 is driven is rotation by a motoreducing unit 3 that determines the speed of progress in the producing line. The member c then runs through the manufacturing device embodying the invention where it is surrounded by extrusion by the helical-groove cylindrical structure b. The extruder or extruders and the die included in the manufacturing device 4 are also under control of the speed imposed by the motoreducing unit 3.

The grooved core is cooled upon leaving the device 4 in a cooling tube 6 prior to being measured in a diameter checking device 7 and wound on a reel 8. The invention thus consists essentially of obtaining the grooves a during the extrusion phase by means of the manufacturing device 4.

Figure 3:
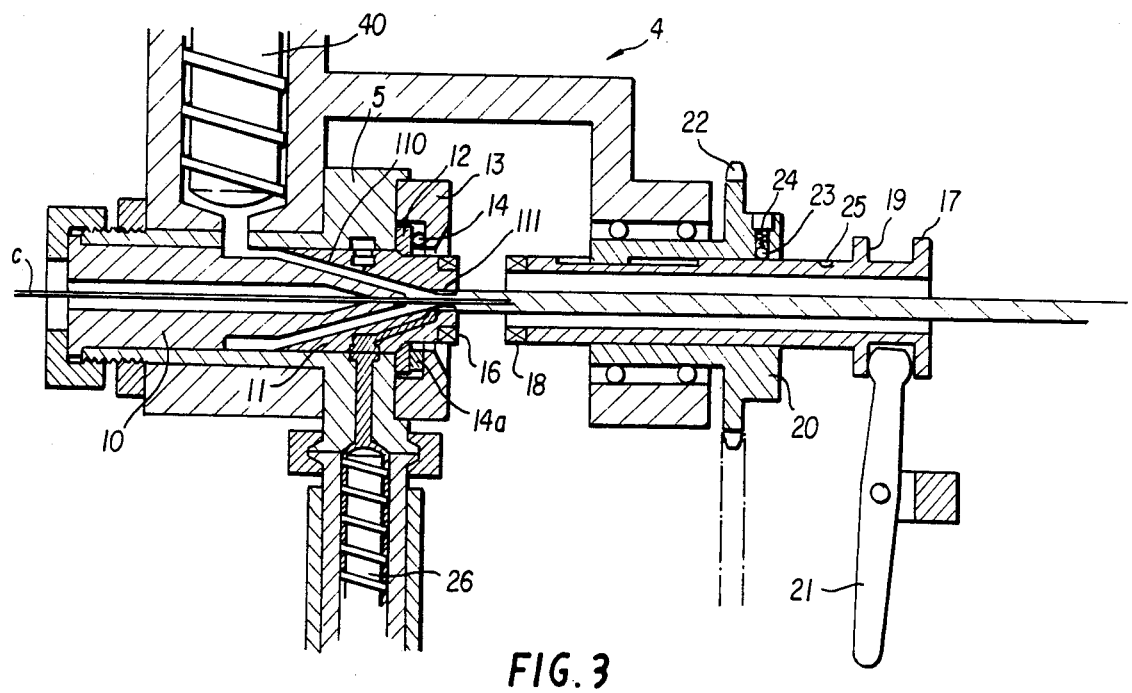
FIG. 3 is a cross-sectional axial view of the core manufacturing device according to the invention.

In reference to FIG. 3, the manufacturing device 4 comprises a main extruder 40, the extruding screw of which is orthogonal to the extrusion line which corresponds to the axis of the strength member c supplied from the capstan 2. The extruder 40 is fitted with an extruding head 5 around a central member in the form of an axial tapered tube 10 through which the strength member c is guided. A single integral die 11 is rotatably mounted around the member c at the front of the tube 10. The die 11 is held at a predetermined distance from the tube 10 by means of a butt washer 12 with a spherical bearing surface which at the rear takes a spherical shoulder of the die and is held before the front face of the head 5 by a stationary collar 13 secured to said front face. Since the extruder material exerts on the die 11 a considerable thrust that is borne by the collar 13, a ball thrust-bearing 14 is inserted between the washer 12 and the collar 13, as shown in the upper part of FIG. 3. This considerably reduces this thrust effect due to the extruded material and hence also reduces the die drive torque. The spherical contact between the washer 12 and the rotating die 11 ensures excellent sealing qualities.

Figure 4:
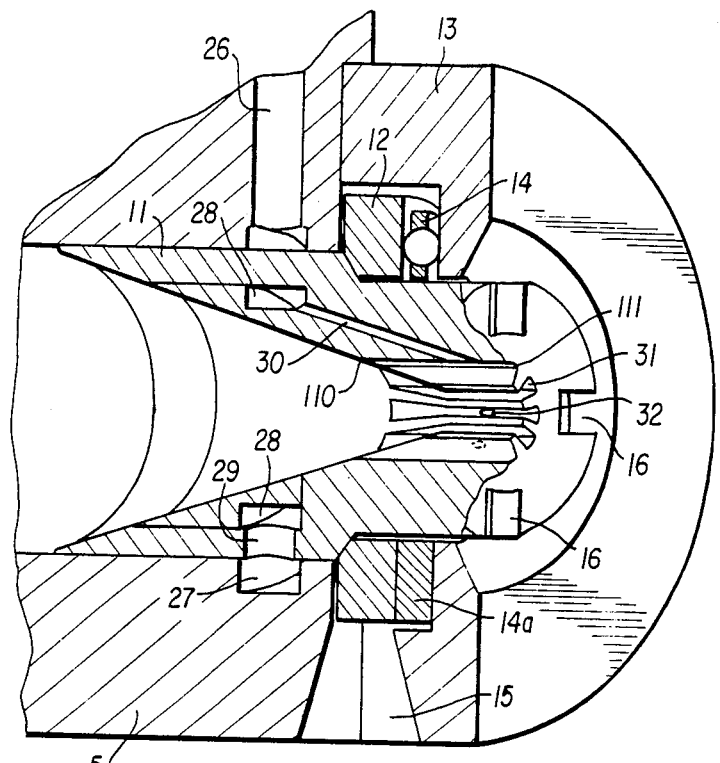
FIG. 4 is a detailed cross-sectional axial view of the front part of the manufacturing device including the rotating integral die.

The temperature and pressure conditions, well known by those skilled in the art, are such that is very difficult to ensure a rotation freedom and satisfactory imperviousness at one and the same time. As shown in the lower half of FIG. 3, the ball thrust-bearing 14 can be replaced by a self-lubricating type washer or bearing 14a, made of graphite for instance. The washer 14a is capable of withstanding operating temperature and pressure conditions and, as a result of its good friction coefficient, it reduces the constraints regarding the contact surfaces between the pieces 12, 13 and 14. Consequently, rotation occurs only between the washers 12 and 14a thus bringing about continuous glossing of the contact surfaces and satisfactory imperviousness towards the front. An orifice 15 shown in FIG. 4 is provided between the washer 12 between the front face of the head 5 and the collar 13 and enables to drain away any possible extrusion material leakages. From the foregoing and FIG. 4 it is apparent to one with ordinary skill in the art that placement of orifice 15 beneath washer 12 may allow a small quantity of extrusion material entering the orifice from between die 11 and head 5 to act as a lubricant, i.e., self lubricating means, between the rotating die and stationary head, while also tending to lubricate contact surfaces between washer 12, collar 13 and thrust bearing 14.

The die 11 can be reciprocally rotatably driven by a number of methods, either by a driving member, a gear on an outside belt.

FIG. 3 depicts rotating driving means in the shape of a driving member which is integral in rotation with a gear 22 and which is made up of a hollow tube 17 having notches and teeth 18 at the rear designed to cooperate with the complementary teeth and notches 16 which are evenly spaced out on the front face of the die 11. The hollow tube 17 is slidably mounted along the extrusion axis before the front face of the die 11 50 that teeth 18 engage notches 16. The tube 17 slides in the hub 20 of the gear 22 and is integral therewith in rotation. The tube 17 sliding action along the extrusion line is controlled by a lever 21 the end of which is engaged in a peripheral front guide 19 running around the tube 17.

The gear 22 causes the tube 17 to rotate as soon as the capstan 2 starts up.

After having adjusted the extruder 40 appropriately, especially as regards the temperature and the material flow setting, the tube 17 is slid rearwards by acting on the lever 21 such that the teeth 18 engage with the notches 16 and the die 11 becomes integral with the driving tube 17. The die 11 is then rotated by the tube 17 which is located, in axial translation, in this position by a ball 23 that is pushed into a small recess 25 in the tube 17 by a spring 24 housed in the hub 20.

FIG. 4 is a detailed view of the die 11 provided with the washer 12, the thrust bearing 14 or 14a together with the collar 13. The rotating die 11 includes a tapered cavity 110 into which the extruding material is fed by the extruder 40. The cavity 110 surrounds the conical external end of the central tube 10 and is directly extended axially by a bore 111 having longitudinal channels 31. The channels 31, let there be ten for example, are machined into the front cylindrical bore 111 of the die 11 which is surrounded by the pieces 12, 13 and 14. The channels 31 lie parallel with the die 11 axis of revolution over a predetermined length with a view to avoiding tearing the grooves a and to forming a perfectly sized core b. The dimensions of the cross-section die channels 31 determine the dimensions of the cross-section of core grooves a. The number of channels 31 and their pitch determine those of the grooves a around the core b.

The rotational speed of the gear 22 (FIG. 3) which is slaved to the capstan 2 (FIG. 2) linear speed, determines the helical pitch of grooves a. This pitch can be adjusted by introducing a mechanical speed variator 42 between the capstan 2 and the gear 22 as shown in FIG. 2. Any other speed slaving means may also be utilized such as electrical slaving for controlling motors.

By manufacturing the grooves a using the single rotating die comprising channels, perfect groove regularity and spacing are advantageously achieved together with manufacturing simplicity. It also permits groove identification.

It is known that each groove serves as a receptacle for an optical fiber. This invention is further aimed at easing the identification of the grooves, i.e. the threads or stripes between the grooves in the core, for want of identifying the fibers. The extrusion of a core with helical grooves using the rotating die as described hereinabove further makes it possible then to identify the core grooves and hence the fibers by utilizing at least one auxiliary extruder, as shown in FIGS. 3 and 4. the auxiliary extruder 26 injects a coloured extrusion material into an annular groove 27 running in the extruding head 5. The material extruded by the auxiliary extruder 26 has a coloration different from that of the material extruded by the main extruder 40. The auxiliary extruder 26 is preferably arranged perpendicular to the die axis in communication with annular groove 27. A hole 29, chosen with an appropriate width, is drilled in the body of the die 11. The coloured material from the auxiliary extruder 26 flows through the hole 29 and then through an internal cavity 28 and a chosen number of internal conduits 30 converging on the front of the die 11. Each conduit 30 runs out into a hole 32 in a respective channel 31.

In practice, three conduits 30 feeding the three respective channels 31 with coloured material are advantageously adopted.

According to an aspect of the invention, the distribution of the channels 31 receiving the coloured material is chosen so that they are not adjacent, but are at relative positions analogous to the positions of the threads or stripes d between grooves that are shaded in FIG. 1. For this illustrated example, a first channel and the following third and fourth channels numbered on clockwise receives the coloured material from respective holes 32. The coloured stripes d form identifying marks of the optical fibers by means of a single colour.

According to another aspct of the invention, several different colours may be adopted. With this in mind, several auxiliary extruders $26_1$ to $26J$ are arranged perpendicular to the die 11 axis. Each auxiliary extruder extrudes material having a predetermined colour different from the colour of the other extruders. The thickness of the coloured line-like stripes is adjusted by varying the speeds of the auxiliary extruders $26_1$ to $26_J$. By slaving the main and auxiliary extruder motor speeds, the colour flow can be matched with the extruder material flow. Each auxiliary extruder $26_j$, with the integer number j such as $1 \leq j \leq J$, flows separately into a respective individual annular cavity $27_j$ the respective coloured material that is guided through a respective hole $29_j$, a respective internal cavity $28_j$ and one or more respective conduits $30_j$, holes $32_j$ and channels $31_j$. There are as many cavities $28_j$ as auxiliary extruders $26_j$.

Figure 5:
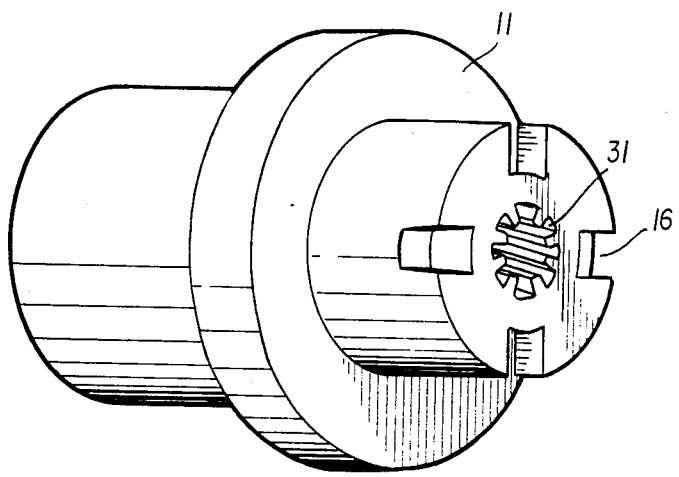
FIG. 5 is a perspective view of a rotating integral die including helical channels.

FIG. 5 depicts another embodiment of the rotating die 11 in which the channels 31 are no longer parallel with the die 11 axis of revolution but are set out helically around the inside cylindrical surface 111 of the die 11. A core embodiment made with helical grooves such as this is also compatible with identifying grooves.

It would also be possible to develop a core having alternate direction helical grooves, well known to those skilled in the art. The gear 22 direction of rotation then merely has to be reversed periodically by means of a mechanical devive not shown. The core then has helical grooves the helical direction of which alternates every revolution or every fraction of a revolution or even every m revolution, where the integer number m is predetermined. Such a grooved core embodiment is always compatible with the identification by means of auxiliary extruders giving into the same rotating die, where each extrusion channel may also be individualized by specifically supplying a desired colour by means of an individual auxiliary extruder.

What I claim is:
1. A device for manufacturing a cylindrical core having helical peripheral grooves, comprising:
  a main extruder;
  a rotating die means having a first extrusion bore for guiding a flow of extrusion material from said main extruder to form the cylindrical core and a second extrusion bore formed with die channels, each channel having a cross section corresponding respectively to the cross section of ribs defining said peripheral grooves therebetween;
  said first and second extrusion bores of the rotating die means formed within a single rotating integral die; and
  auxiliary extruder means connected to the main extruder for feeding an extrusion material of a different color from that of said main extruder along a feed path having conduits within the integral body of said die in communication with at least one of said die channels.

2. The device of claim 1, wherein said die channels are helically formed with respect to the die axis of rotation over a predetermined length thereof.

3. A device as claimed in claim 2 comprising driving means rotating around the axis of said die and sliding along said die axis for engaging in said die.

4. The device of claim 1, wherein said main extruder includes an extruder head, said device further including a stationary collar connected to the extruder head, a washer within the collar in sealing contact with an outer wall of said die and a ball thrust-bearing disposed between said washer and collar, said washer and thrust bearing transmitting axial thrust forces to the stationary collar which are exerted by the extrusion material on the die to thereby prevent leakage of extrusion material from the die while reducing die drive torque.

5. A device as claimed in claim 4 comprising driving means rotating around the axis of said die and sliding along said die axis for engaging in said die.

6. The device of claim 1 wherein said main extruder includes an extruder head, said device further including a stationary collar connected to extruder head, a washer within the collar in sealing contact with said die and a self-lubricating material thrust bearing disposed between said washer and said collar.

7. The device claimed in claim 6 wherein said washer and said die engage through spherical contact surfaces.

8. A device as claimed in claim 6 comprising driving means rotating around the axis of said die and sliding along said die axis for engaging in said die.

9. A device as claimed in claim 1, wherein said auxiliary extruder means comprises a plurality of auxiliary extruders for respectively feeding extrusion materials of further different colours from each other and material fed through said main extruder and which each feed at least one respective channel in said die via a respective conduit inside the integral body of said die.

10. The device of claim 1, wherein said rotating die means is disposed around a central member on which the cylindrical core is formed.

11. The device of claim 1, wherein said auxiliary extruder means includes an outlet formed in an extruder head of said main extruder, said outlet supplying extrusion material into an annular groove formed on an inner surface of said extruder head in contact with said single die, said single die having a hole connecting said groove to an interior cavity and plural conduits, said hole and conduits both being formed within the die, said conduits being inclined with respect to and towards the die axis and terminating in said die channels to supply colored extrusion material to apices of said ribs.

12. A device for manufacturing a cylindrical core having helical peripheral grooves, comprising:
  a main extruder having a stationary extruder head;
  a rotating die means connected to receive a flow of extrusion material from said main extruder; said rotating die means having a first extrusion bore rotating about a longitudinal axis thereof for guiding a flow of extrusion material from said main extruder to form the cylindrical core and a second extrusion bore formed with die channels rotatable about a longitudinal axis of the second bore, each channel having a cross section corresponding respectively to the cross section of ribs defining said peripheral grooves between adjacent ribs to form said helical peripheral grooves;
  a stationary collar connected to the extruder head;

a washer disposed within the collar in sealing contact with the rotating die means and thrust bearing means disposed between said washer and collar, said washer and thrust bearing means transmitting to the stationary collar axial thrust forces exerted by the extrusion material on the rotating die means to minimize leakage of the extrusion material from the rotating die means while reducing die drive torque, and an orifice formed in the extruder head in communication with the washer for draining away from the manufactured cylindrical core extrusion material entering the orifice from between the rotating die means and extruder head, said leaked extrusion material tending to act as a lubricant between said rotating die means and stationary extruder head while also tending to lubricate contact surfaces between said washer, collar and thrust bearing means before passing through said orifice.

13. The device claimed in claim 12 wherein said washer and die engage each other through spherical contact surfaces.

14. A device as claimed in claim 12 further comprising driving means rotatable about and slidable along the die axis for engaging and rotating said die.

15. A device as claimed in claim 12 further comprising means for locking the driving means in engagement in said die.

16. A device as claimed in claim 12 comprising an auxiliary extruder the extrusion material of which has a colour different from that of said main extruder and feeds at least one channel in said die via conduits inside the integral body of said die.

17. A device for manufacturing a cylindrical core having helical peripheral grooves, comprising:
a main extruder having an extruder head;
means for guiding a flow of extrusion material from said main extruder to form the cylindrical core;
rotating die means located downstream from said material flow guiding means and including a bore having die channels for forming said peripheral grooves, said rotating die means including a side wall extending generally parallel to a longitudinal die axis in intimate contact with a side wall of said extruder head;
a stationary collar connected to the extruder head for mounting the rotating die means thereto; and
washer means mounted between the collar and rotating die means for transmitting to the head and through the collar axial thrust forces exerted by the extrusion material on the rotating die means, said washer means including spherical contact surfaces in sealing contact with a spherical shoulder of said rotating die means for preventing leakage of extrusion material from an interface formed between the rotating die means and the head.

18. A device as claimed in claim 17 comprising an auxiliary extruder the extrusion material of which has a colour different from that of said main extruder and feeds at least one channel in said die via conduits inside the integral body of said die.

19. A device for manufacturing a cylindrical core having helical peripheral grooves, comprising:
a main extruder;
a rotating die means connected to receive a flow of extrusion material from said main extruder; said rotating die means having a first extrusion bore rotating about a longitudinal axis thereof for guiding a flow of extrusion material from said main extruder to form the cylindrical core and a second extrusion bore formed with die channels rotatable about a longitudinal axis of the second bore, each channel having a cross section corresponding respectively to the cross section of ribs defining said peripheral grooves between adjacent ribs to form said helical peripheral grooves; and
driving means rotatable about a longitudinal axis of said die means and slidable along said die axis for selectively engaging with said die means to rotate said die means.

20. A device as claimed in claim 19 comprising an auxiliary extruder the extrusion material of which has a colour different from that of said main extruder and feeds at least one channel in said die via conduits inside the integral body of said die.

21. A device as claimed in claim 19 comprising several auxiliary extruders the extrusion materials of which each have different colours no one of them being the same as that of said main extruder and which each feed at least one respective channel in said die via a respective conduit inside the integral body of said die.

22. The device of claim 19, wherein said driving means is a tubular member mounted to slide along said die axis, said tubular member having a rear end formed with first coupling means matingly engageable with second coupling means formed on the front face of said die means and in axial alignment therewith to impart rotational movement to said die means when said tubular member slides into contact therewith.

23. The device of claim 22, wherein said first coupling means includes teeth and said second coupling means includes notches.

24. The device of claim 22, wherein said tubular member is co-rotationally and slidably supported on a hub mounted to the main extruder, said hub being formed with gear teeth slaved to a means for controlling speed of a main extruder drive motor.

25. A device for manufacturing a cylindrical core having helical peripheral grooves, comprising:
a main extruder having a stationary extruder head;
a rotating die means connected to receive a flow of extrusion material from said main extruder; said rotating die means having a first extrusion bore rotating about a longitudinal axis thereof for guiding a flow of extrusion material from said main extruder to form the cylindrical core and a second extrusion bore formed with die channels rotatable about a longitudinal axis of the second bore, each channel having a cross section corresponding respectively to the cross section of ribs defining said peripheral grooves between adjacent ribs to form said helical peripheral grooves;
a stationary collar connected to the extruder head;
a washer disposed within the collar in sealing contact with the rotating die means and thrust bearing means disposed between said washer and collar, said washer and thrust bearing means transmitting to the stationary collar axial thrust forces exerted by the extrusion material on the rotating die means to minimize leakage of the extrusion material from the rotating die means while reducing die drive torque, and an orifice formed in the extruder head in communication with the washer for draining away from the manufactured cylindrical core extrusion material entering the orifice from between the rotating die means and extruder head, said leaked extrusion material tending to act as a lubricant between said rotating die means and stationary extruder head while also tending to lubricate contact surfaces between said washer, collar and thrust bearing means before passing through said orifice;

driving means rotatable about a longitudinal axis of said die means and slidable along said die axis for selectively engaging said die means to rotate said die means; and auxiliary extruder means connected to the main extruder for feeding an extrusion material of a different color from that of said main extruder along a feed path having conduits within the integral body of said die in communication with at least one cf said die channels.

26. A method of manufacturing an optical cable having a cylindrical core formed with helical peripheral grooves adopted to carry optical fibers therein, comprising the steps of:

(a) directing a flow of extrusion material into a tapered interior cavity formed between a tapered tube and an extruder head;

(b) guiding said flow of extrusion material from said cavity into a first extrusion bore formed within a single rotating die while feeding a strength member through a central hollow region of said tapered tube so that said extrusion material covers said central member to form said cable therewith whereby said cable is reinforced by the central member;

(c) feeding said formed cylindrical core from the first extrusion bore into a second extrusion bore formed with die channels within said single die to impart to said cylindrical core a series of circumferentially spaced ribs having a cross section corresponding respectively to the cross section of said die channels; and (d) cooling said grooved cylindrical core after it passes through said single rotating die.

* * * * *